T. HAZARD
Fodder Cutter.

No. 54,899. Patented May 22, 1866.

Witnesses: Inventor:

UNITED STATES PATENT OFFICE.

THOMAS HAZARD, OF WILMINGTON, OHIO.

IMPROVEMENT IN FODDER-CUTTERS.

Specification forming part of Letters Patent No. 54,899, dated May 22, 1866.

*To all whom it may concern:*

Be it known that I, THOMAS HAZARD, of Wilmington, Clinton county, Ohio, have invented a new and useful Fodder-Cutter; and I do hereby declare the following to be a full, clear, and exact description thereof, reference being had to the accompanying drawings, making part of this specification.

This invention relates to a machine for cutting hay, cornstalks, and other fodder of that class in which the substance to be cut is fed automatically to the action of a reciprocating knife, my improvement being intended to effect the operation in a more positive, accurate, and facile manner than heretofore.

Figure 1:
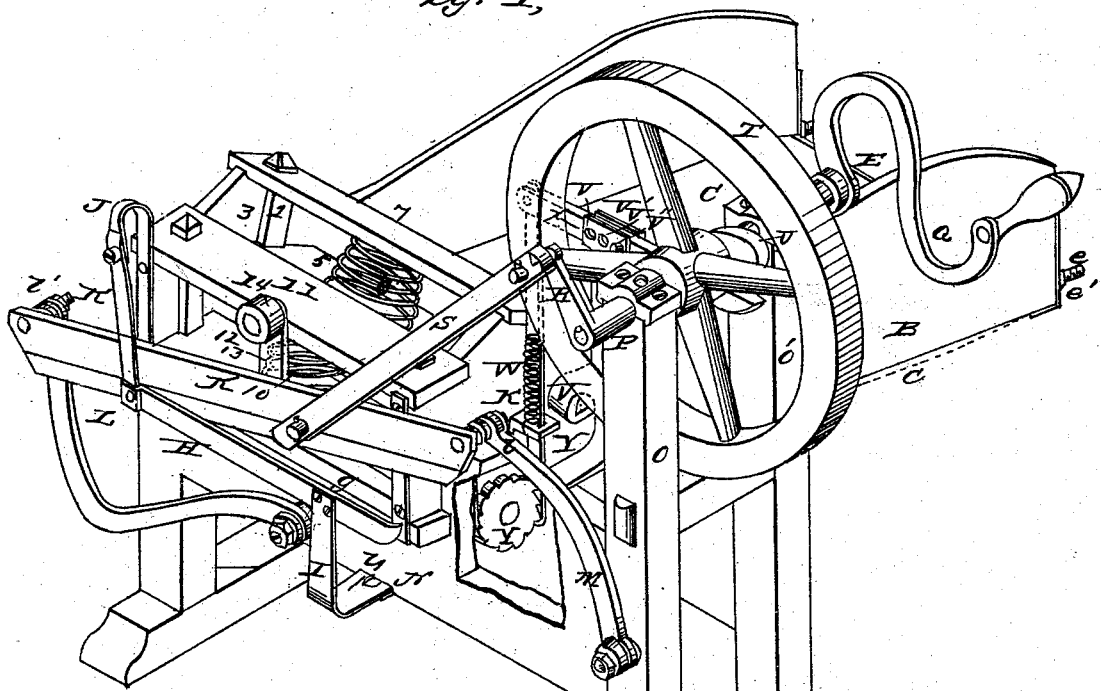
Figure 2:
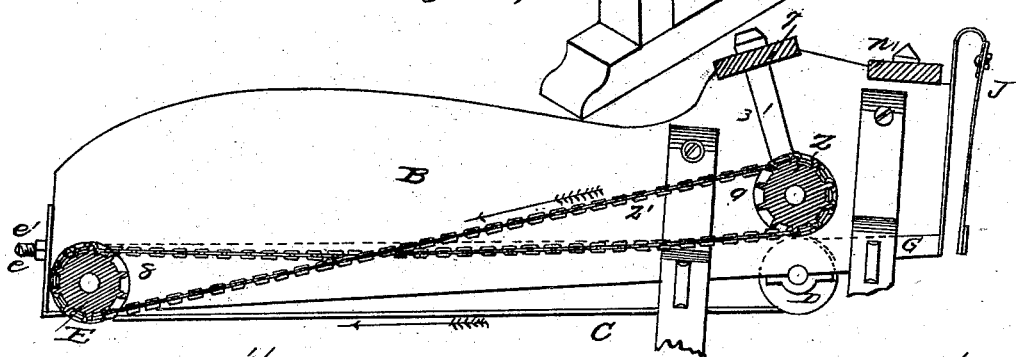

Figure 1 is a perspective view of a machine embodying my improvements. Fig. 2 is a side elevation of the feeding-box and its accessories.

A is a frame supporting the various operating parts. B is a trough or box having spread over its floor an endless apron, C, which is stretched around rollers D E, of which one, D, is provided with a ratchet-wheel, F, through which an intermittent motion is imparted to the apron, in a manner presently explained. The other roller, E, is journaled in sliding bearings having screws $e$ and nuts $e'$, by means of which the apron is brought to and maintained at the proper tension.

G is a throat-piece so arranged as for its upper surface to form a continuation of that of the endless apron. The throat-piece G is armed at its front edge with a suitable bit or steeling, $g$.

H is a guard or mouth-piece, supported by means of arms I and J, level and parallel with the throat-piece G, and so much in front of it as to admit between them of a knife, K, which is pivot-bolted to arms L M, which are themselves pivot-bolted to the frame in such position as to cause the knife to sweep the throat of the box with a draw or sliding cut.

The mouth-piece H serves the twofold purpose of holding the knife snugly to the throat and of supporting the ends of the stalks in the act of cutting.

In order to enable the adjustment of the mouth-piece to such distance from the throat as to hold the knife snugly to its work without undue friction, I provide in the arm I a slot, $i$, which enables the operator to set the mouth-piece out or in at discretion, and a screw-bolt, N, which enables him to fix the bar to any specific adjustment.

The pivot-bolts $k\ k'$, which connect the knife K to the arms L M, are screw-threaded to receive nuts $l\ l'$, by means of which the knife is both secured to the arms and also nicely adjusted toward or from the throat, so as to act closely and efficiently therewith without undue wear of the cutting-edges.

Standards O O′, rising from and forming a part of the frame, afford elevated bearings for the journals of a horizontal drive-shaft, P, provided at one end with a winch, Q, and at its other end with a crank, R, which is connected by pitman S to the knife. The said shaft P is also provided with a fly-wheel, T, and a cam, U.

V is a standard, having a series of holes, $v\ v'\ v''$, at top for the discretionary insertion of the fulcrum-pin W of a lever, X, with a series of holes, which correspond in number and position to those in the standard. One end of this lever is operated upon by the cam U, and the other end has pivoted to it a drag feed-hand or claw, Y, which engages in the teeth of the ratchet-wheel F, rotating it a distance of one, two, or three teeth at each turn of the winch, according to which of the holes $v$, $v'$, or $v''$ the fulcrum-pin W is made to occupy.

A spring, $w$, serves to retract or draw down the claw to its starting position after each stroke.

The ratchet-wheel is held to the position to which is rotated by the feed-hand by means of a pawl or detent, Y′.

Z is a yielding feed and pressure roller, whose journals rotate in a pair of followers, 1 2, which occupy slots 3 4 in the frame, and are connected by a rail, 5, which receives a downward pressure from a helical or spiral spring, 6, which abuts against a cross-beam, 7, of the frame.

The roller Z is driven by a chain, Z′, which is engaged around claw-pulleys 8 and 9 on the shaft E of the apron and pressure-roller Z, respectively. A spring, 10, abutting against a beam, 11, and pressing upon a board, 12, causes the latter to hold the fodder tightly down in a compact mass upon the throat-piece during the descending or effective stroke of the knife.

The board 12 has an arm, 13, carrying a roller, 14, against which the back of the knife impinges when near the termination of its return stroke, so as to relieve the fodder from the stress of the board 12 and to permit an unrestricted operation of the feed.

The provision of the chain Z' and the chain-pulleys E and Z causes or insures a positive propulsion of the feed-apron corresponding to the motion imparted to the ratchet, which, being impelled by dragging instead of a pushing feed hand or pawl, is found to be more certain in its operation.

I claim herein as new and of my invention—

1. The provision of the guard or mouth-piece H, having the slotted arm I $i$ and screw-bolt N, and being formed and adapted to operate in connection with the throat G and knife K in the manner explained.

2. The arrangement of obliquely-moving knife K, pressure-board 12, arm 13, and roller 14, for the purpose described.

In testimony of which invention I hereunto set my hand.

THOS. HAZARD.

Witnesses:
GEO. H. KNIGHT,
JAMES H. LAYMAN.